(12) United States Patent
Okamori et al.

(10) Patent No.: US 6,461,001 B2
(45) Date of Patent: Oct. 8, 2002

(54) ILLUMINATION APPARATUS AND PROJECTION TYPE DISPLAY APPARATUS

(75) Inventors: Shinji Okamori; Akihisa Miyata; Takeshi Utakoji; Shinsuke Shikama, all of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/839,129

(22) Filed: Apr. 23, 2001

(65) Prior Publication Data

US 2002/0024636 A1 Feb. 28, 2002

(30) Foreign Application Priority Data

Apr. 25, 2000 (JP) ........................................ 2000-124115

(51) Int. Cl.⁷ ............................................. G03B 21/20
(52) U.S. Cl. ...................................................... 353/102
(58) Field of Search ........................... 353/97, 100, 101, 353/102, 122

(56) References Cited

U.S. PATENT DOCUMENTS 5,795,047 A * 8/1998 Sannohe et al. .............. 353/34
5,860,721 A * 1/1999 Bowron et al. ............. 353/101

FOREIGN PATENT DOCUMENTS

| GB | A2324166 | 10/1998 | |
|---|---|---|---|
| JP | 161237 | * 6/1998 | ........... G03B/21/00 |
| JP | 10161237 | 6/1998 | |
| JP | A10161237 | 6/1998 | |
| JP | 11002780 | 1/1999 | |

OTHER PUBLICATIONS

10161237, Jun. 19, 1998 and 11002780, Jan. 6, 1999 Englist Abstract Only.

* cited by examiner

*Primary Examiner*—Russell Adams
*Assistant Examiner*—Andrew Sever (57) ABSTRACT

An illumination apparatus and a projection type display apparatus of lower cost are provided, in which extra-axial aberrations, especially distortion and lateral aberration, are favorably corrected, and the dimensional margin of illumination is suppressed to enhance the utilization factor of light. The illumination apparatus includes a first group of lenses which includes a meniscus lens having a positive refracting power, a second group of lenses which includes first lens means having a negative refracting power and second lens means having a positive refracting power, and lens means whose surface immediately before a surface to-be-illuminated is a plane surface, whereby an illuminating light beam is caused to exit in a telecentric state.

10 Claims, 5 Drawing Sheets

ILLUMINATION APPARATUS AND PROJECTION TYPE DISPLAY APPARATUS

BACKGROUND OF THE INVENTION

1. Field of the Invention

The present invention relates to an illuminating optical system, and a projection type display apparatus employing the illuminating optical system.

2. Description of the Related Art (Background)

In recent years, a projection apparatus (projection type display apparatus) has been highlighted as an image display apparatus for a large screen. Products available as such projection apparatuses include a CRT (Cathode Ray Tube) projection apparatus employing a small-sized CRT of high definition and high luminance, a liquid-crystal projection apparatus employing a liquid crystal panel, a DMD (Digital Micromirror Device) projection apparatus employing a DMD, etc.

Further, a category called "data projector" which, not only copes with AV sources such as a motion picture and a TV program, but also projects a computer image, is rapidly spreading its market. The performances of the data projector, such as the brightness, contrast and resolution of a projected image and uniformity in the brightness, have been remarkably enhanced.

The projection apparatus employing a light valve, such as the liquid crystal panel or the DMD, is superior to the CRT projection apparatus especially due to the fact that a brightness and a resolution can be enhanced independently of each other. Accordingly, the light-valve projection apparatuses are being increasingly applied to projection television sets (rear projection type projectors).

Most of known light-valve illuminating optical systems have been based on a kind of Köhler's illumination wherein the light valve is arranged and illuminated in the optical path of a lens system in which a light source and the exit pupil of a projecting lens are held in a conjugate relationship.

In recent years, however, fly-eye integrator illumination or rod integrator illumination has been often employed for enhancing uniformity in illumination, and a demand has been made for an optical system which has a higher level of image forming performance and a more complicated architecture as compared with the illuminating optical system.

(Related Art)

Figure 6:
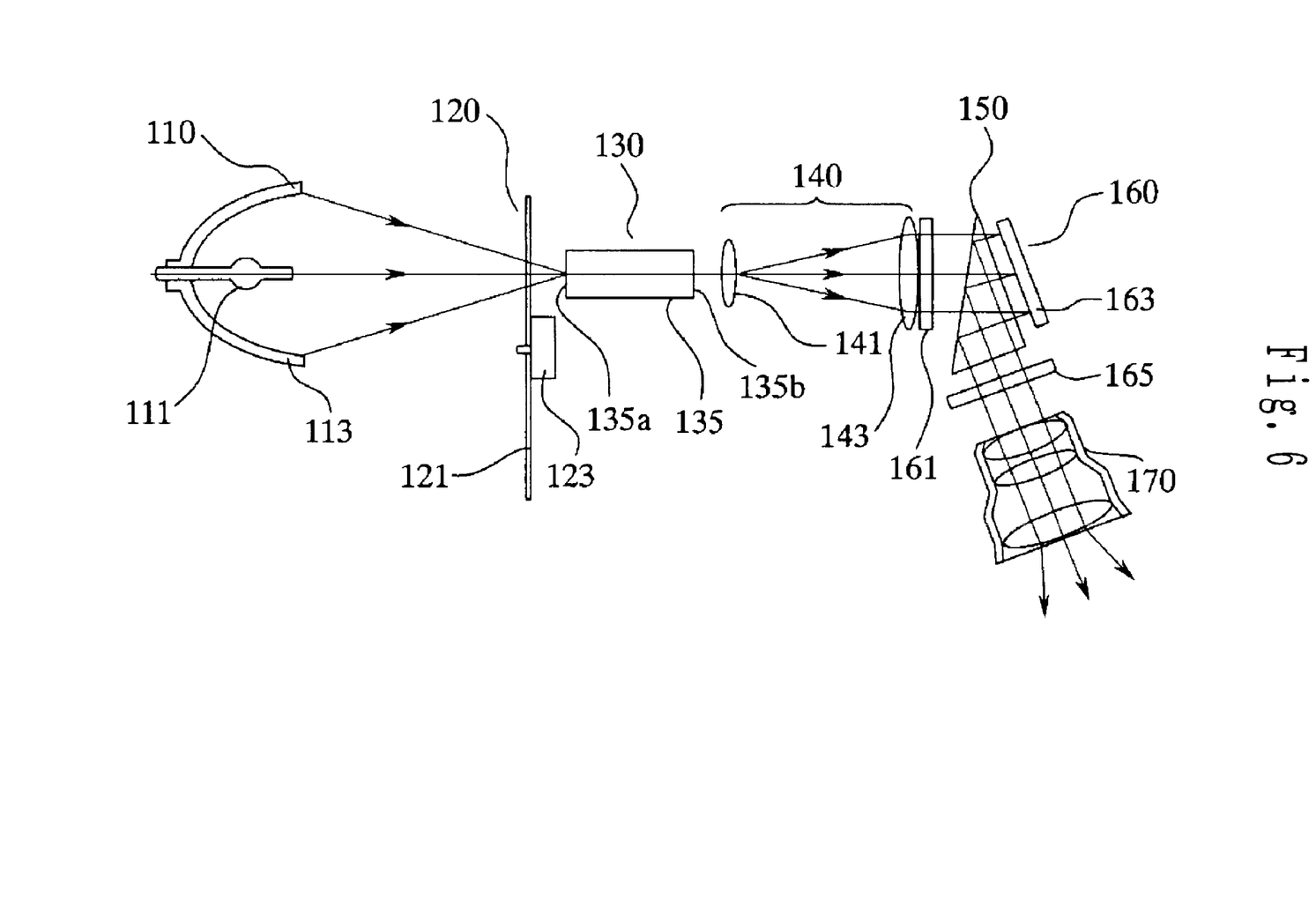
FIG. 6 is a schematic arrangement diagram of an illumination apparatus in the related art.

FIG. 6 shows a related art reflection type projector disclosed in the official gazette of Japanese Patent No. 2,939,237. Referring to the figure, numeral 110 designates a lamp house which generates light and causes it to emerge therefrom, and which is configured of a lamp 111 and a reflector 113.

Numeral 120 designates a color wheel through which the light emergent from the lamp house 110 is selectively transmitted depending upon wavelengths, and which includes a color filter 121 adapted to be rotated by a driver 123. The projector also comprises light mixing means 130 for diverging/converging or irregularly reflecting the light having entered from the side of the lamp house 110, so as to turn it into uniform light, a relay lens unit 140 which converges the entering light and turns it into parallel light rays, a critical angle prism 150 which reflects light reflected from image generation means 160 and then having entered into this prism again, and a projection lens unit 170 which magnifies entering light rays and transmits them toward a screen.

As a practicable example of the light mixing means 130, a scrambler 135 is arranged in the illustration. The scrambler 135 forms a rectangular parallelepiped (alternatively, a regular hexahedron) out of an entrance surface 135a which is perpendicular to an optical path and which is located at the point of convergence of the light emitted from the lamp 111, an exit surface 135b which is also perpendicular to the optical path, and four side surfaces. More specifically, the exit surface 135b is in the shape of an oblong and has an aspect ratio which corresponds to that of an FLCD (Ferroelectric Liquid Crystal Display) 163 forming the image generation means 160. The non-uniform light rays emergent from the lamp house 110 are mixed by the scrambler 135 into the uniform light, which is caused to exit from the exit surface 135b. The relay lens unit 140 is configured of a converging lens 141 for diverging the uniform light, and a collimator lens 143 for converging the entering divergent light rays into the parallel light rays, by which the FLCD 163 is illuminated.

In the illustrated architecture, the image generation means 160 is formed of the FLCD 163, and hence, a polarizer 161 and an analyzer 165 are disposed before and behind the FLCD 163.

According to the construction of the related art example, it is possible to provide the reflection type projector which changes the traveling path of the light by adopting the critical angle prism, thereby excluding the adoption of a polarizing beam splitter, and in which the optic axis alignment of the optical system is facilitated without requiring a great optical length. Besides, according to the so-called "rod integrator illumination" employing light mixing means such as a scrambler 135, the architecture of an optical system is simplified, and it is possible to provide an illuminating optical system and a projection apparatus of excellent cost performance.

SUMMARY OF THE INVENTION

An object of the present invention is to provide an illuminating optical system in which non-uniformity in the intensity of light emitted from a light source is relieved to enhance uniformity in the brightness of an illuminating light beam, and in which an illumination margin is decreased to heighten the utilization factor of light, and a projection apparatus in which the illuminating optical system is mounted.

An illumination apparatus according to the present invention is characterized by comprising focusing means for focusing light emitted from a light source; columnar optical means having its light entrance portion located in the vicinity of a position where the emitted light is focused by the focusing means, and for propagating the entering light having entered from the light entrance portion and causing the propagated light to exit from its light exit portion; and transferring optical means including a first group of lenses which receive the exiting light from the columnar optical means and which have a positive refracting power, a second group of lenses which receive exiting light from the first group of lenses and which have a positive refracting power, and a third group of lenses which receive exiting light from the second group of lenses and which have a positive refracting power, wherein the respective groups of lenses are successively arrayed from a side of the columnar optical means toward a side of a surface to-be-illuminated and satisfy relationships of inequalities (1) and (2) given below, and wherein the light exit portion of the columnar optical means and the surface to-be-illuminated are held in a conjugate relationship;

$$0.37 < f1/f0 < 0.62 \quad (1)$$

$$\nu p/\nu n > 1.99 \quad (2)$$

where
- f0: focal length of the transferring optical means,
- f1: focal length of the first group of lenses,
- νp: means Abbe number of a positive lens included in the second group of lenses, and
- νn: means Abbe number of a negative lens included in the second group of lenses.

Besides, a projection type display apparatus according to the present invention is characterized by comprising a light source; focusing means for focusing light emitted from the light source; columnar optical means having its light entrance portion located in the vicinity of a position where the emitted light is focused by the focusing means, and for propagating the entering light having entered from the light entrance portion and causing the propagated light to exit from its light exit portion; transferring optical means including a first group of lenses which receive the exiting light from the columnar optical means and which have a positive refracting power, a second group of lenses which receive exiting light from the first group of lenses and which have a positive refracting power, and a third group of lenses which receive exiting light from the second group of lenses and which have a positive refracting power, wherein the respective groups of lenses are successively arrayed from a side of the columnar optical means toward a side of a surface to-be-illuminated and satisfy relationships of inequalities (1) and (2) given below, and wherein the light exit portion of the columnar optical means and the surface to-be-illuminated are held in a conjugate relationship; optical-path deflection means receiving light exiting from the transferring optical means, and for deflecting the exiting light in a direction different from an entering direction thereof; light modulation means disposed at a position of the surface to-be-irradiated so as to receive the exiting light from the transferring optical means after the deflection by the optical-path deflection means, and for modulating the exiting light in two dimensions so as to generate modulated light; and projection means for projecting the modulated light generated by the light modulation means;

$$0.37 < f1/f0 < 0.62 \quad (1)$$

$$\nu p/\nu n > 1.99 \quad (2)$$

where
- f0: focal length of the transferring optical means,
- f1: focal length of the first group of lenses,
- νp: means Abbe number of a positive lens included in the second group of lenses, and
- νn: means Abbe number of a negative lens included in the second group of lenses.

DETAILED DESCRIPTION OF THE PREFERRED EMBODIMENTS

In general, in a case where the non-uniform light emergent from the lamp house 110 is uniformalized using the scrambler 135, so as to enhance an illumination efficiency, the relay lens unit 140 ought to be configured so that the exit surface 135b and the FLCD 163 to be illuminated may be held in a substantially conjugate relationship. An image forming performance required of the illuminating optical system of a projection apparatus is at a low level as compared with the performance of an ordinary photographic lens or that of the projecting optical system of a projector. In the related art example, therefore, the converging lens 141 and the collimator lens 143 which constitute the relay lens unit 140 are not concretely disclosed regarding practicable examples.

In order to obtain a projection apparatus of high efficiency, however, the following conditions are important:

(1) To design an illuminating optical system for efficiently illuminating a light valve, especially to minimize an illumination margin for a region to-be-illuminated (the rate of the loss of irradiating energy relative to a region to-be-irradiated, or the rate of unavailable light incurred by the size of an irradiating light flux) (in other words, to enhance the utilization factor of light).

(2) To enhance uniformity in the intensity of irradiating light within a region to-be-illuminated.

The former (1) is a subject which chiefly concerns the chromatic aberration of a transferring optical system. When the images of the monochromatic lights of colors R, G and B are not superposed, that is, when the sizes of the areas of illuminating light beams or irradiated positions are different in the region to-be-irradiated, a region except a part at which all the R, G and B monochromatic lights are superposed to whiten cannot present the normal display of a color image, and hence, it essentially forms a loss.

Especially in case of a single-plate type projection apparatus which presents a color display by means of a single light valve, the optical paths of the R, G and B monochromatic lights are common, so that the chromatic aberration needs to be removed (corrected) more carefully than in case of a multiple-plate type projection apparatus in which aberration corrections can be made for the individual monochromatic lights.

On the other hand, the latter (2) is based on sufficiently mixing light fluxes, and the image forming performance of an optical system for transferring the mixed light fluxes. A light flux distribution is uniformalized by a scrambler 135. However, when the extra-axial aberrations, such as chromatic aberration and distortion, of an optical system for transferring the uniformalized light fluxes are large, uniformity in the brightness of an illuminating light beam is spoilt, or an illumination margin enlarges unnecessarily, thereby incurring the drawback that an illumination efficiency lowers.

Further, in a case where optical factors (optical elements) other than lens factors, such as color composition, color separation, depolarization and the deflection of a light flux, are complicatedly combined, an appropriate illuminating optical system cannot be obtained without making refined aberration corrections with the influences of the optical factors taken into consideration.

Now, the present invention will be concretely described with reference to the drawings showing embodiments thereof.

(Projection Type Display Apparatus)

As thus far described, a projection apparatus comprises a signal generation unit which generates an electric signal for driving a light valve so as to correspond to, for example, the information of a video signal externally inputted, an illuminating optical system which employs a columnar optical element as described in detail later, and screen means for receiving a light beam projected from a projecting optical system highly matched with the illuminating optical system, so as to project an image on the surface thereof.

EMBODIMENT 1

Architecture of Illuminating Optical System

Figure 1:
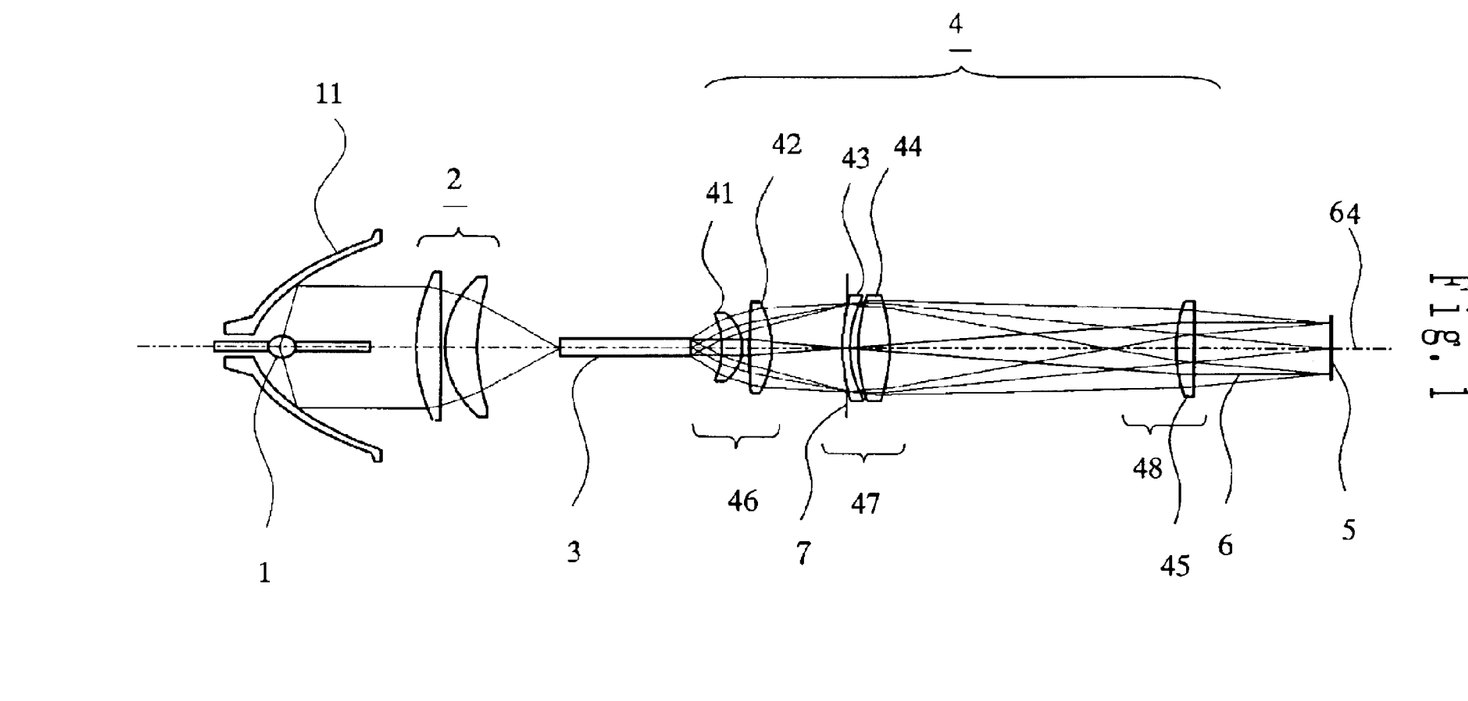
FIG. 1 is a schematic arrangement diagram showing the construction of an illumination apparatus according to Embodiment 1.

FIG. 1 is a schematic arrangement diagram showing the architecture of an illuminating optical system according to one embodiment of the present invention. Referring to the figure, numeral 1 designates a light source, numeral 11 a reflector, numeral 2 a condenser lens system, numeral 3 a columnar optical element, and numeral 4 a relay lens system which is configured of three groups of lenses; a first group of lenses 46 comprised of a first lens 41 and a second lens 42, a second group of lenses 47 comprised of a third lens 43 and a fourth lens 44, and a third group of lenses 48 including a fifth lens 45. In addition, numeral 5 designates a surface to-be-illuminated, and numeral 64 the optic axis of the illuminating optical system (also termed "illuminating optic axis" later).

First, the operations of the respective constituents will be described in succession from the side of the light source 1 toward the side of the surface to-be-illuminated 5.

The light source 1 is made of a light emitting member which emits white light, monochromatic light, or the like. The light emitted from the light source 1 has its rays converged or substantially collimated on the basis of a predetermined method by the reflector 11.

A well-known method for the convergence is such that an ellipsoid-of-revolution mirror is employed as the reflector 11, and that the light source 1 is arranged in the vicinity of the first focal point of the mirror. Also, a well-known method for the collimation is such that a paraboloid-of-revolution mirror is employed as the reflector 11, and that the light source 1 is arranged in the vicinity of the focal position of the mirror.

The reflector 11 exemplified in FIG. 1 is the paraboloid-of-revolution mirror. The light rays substantially collimated by the mirror are converged by the condenser lens system 2, and are guided into the columnar optical element 3 being columnar optical means.

The reflector 11 and the condenser lens system 2 correspond to focusing means here. The light emitted from the light source 1 is focused (the image of the light source is formed) by the condensing means, and the entrance facet (light entrance portion) of the columnar optical element 3 is located in the vicinity of the focusing position.

The columnar optical element 3 functions as a uniformalizing element which relieves the non-uniformity of luminance within the image of the light source 1 focused by the reflector 11 and the condenser lens system 2 (that is, the columnar optical element uniformalizes the luminance by propagating the light having entered thereinto). Thus, a uniform light source surface which serves as an illuminating light source for irradiating the surface to-be-irradiated 5 is formed in the vicinity of the exit facet of the columnar optical element 3.

It is therefore desirable that the shape of the exit facet of the columnar optical element 3 be basically similar to the shape of the surface to-be-illuminated 5. In order to enhance an illumination efficiency, the relay lens system 4 being transfer optical means is configured so as to satisfy an image forming relationship in which the exit facet (light exit portion) of the columnar optical element 3 and the surface to-be-illuminated 5 are conjugate.

Owing to the image forming function of the relay lens system 4, the secondary light source surface of high uniformity, in which the non-uniformity of the luminance within the image has been relieved and which is formed in the vicinity of the exit facet of the columnar optical element 3, has its image formed in the vicinity of the surface to-be-illuminated 5 again so as to illuminate this surface.

On this occasion, the principal light rays 6 of an illuminating light beam fall on the surface to-be-illuminated 5 substantially in parallel with the optic axis 64. That is, the illuminating light beam illuminates the surface to-be-illuminated 5 in an telecentric state. Consequently, the light can be efficiently transferred while holding the light intensity distribution of the secondary light source surface with the non-uniformity of the luminance relieved, and the illumination of high uniformity and high efficiency can be done.

As viewed from the side of the light source 1, the relay lens system 4 is successively configured of the positive meniscus lens 41 with its concave surface facing the side of the light source 1, the biconvex lens 42, the negative meniscus lens 43 with its convex surface facing the side of the light source 1, the biconvex lens 44, and the plano-convex lens 45 with its plane surface facing the side of the surface to-be-illuminated 5. Herein, the positive meniscus lens 41 and the biconvex lens 42 constitute the first group of lenses 46, the negative meniscus lens 43 and the biconvex lens 44 constitute the second group of lenses 47, and the plano-convex lens 45 constitutes the third group of lenses 48.

The first through third groups of lenses 46, 47, 48 are successively arrayed from the side of the columnar optical element 3 toward the side of the surface to-be-irradiated 5. Besides, the second group of lenses 47 include the meniscus lens 43 being convex to the side of the columnar optical element 3 and having a negative refracting power, and the biconvex lens 44, and the respective lenses are also arrayed in succession from the side of the columnar optical element 3 toward the side of the surface to-be-irradiated 5.

In addition, as will be detailed later, among all the lenses constituting the first through third groups of lenses 46, 47, 48, the meniscus lens 43 having the negative refracting power and included in the second group of lenses 47 is made of a glass material different from that of any other lens (the lenses except the meniscus lens 43 are made of the same kind of glass material).

Here, both the first group of lenses 46 and the second group of lenses 47 have positive refracting powers. In this case, also the third group of lenses 48 have a positive refracting power. Considering the facts that the third group of lenses 48 become the final group of lenses in the relay lens system 4, and that the light is propagated to the surface to-be-illuminated 5 posterior to the relay lens system 4 (as will be stated later, light arrives at the surface to-be-illuminated 5 via a prism in some cases), the plano-convex lens 45 mentioned above has its plane surface faced to the surface to-be-irradiated 5 (that is, the surface of the plano-convex lens 45 immediately before the surface to-be-irradiated 5 is the plane surface). By the way, in the ensuing description, a lens having a positive refracting power will be sometimes simply called "positive lens", and a lens having a negative refracting power will be sometimes simply called "negative lens".

In this aspect of performance, the principal light rays 6 of the illuminating light beam which fall on the surface to-be-illuminated 5 are substantially collimated by the fifth lens 45 of low refracting power, thereby realizing the telecentric illumination. Since, however, extra-axial aberrations, especially distortion and chromatic aberration, cannot be corrected by only the lens having the positive refracting power, a lens having a negative refracting power (in the example shown in FIG. 1, the third lens (or negative meniscus lens) 43) is arranged in the second group of lenses 47, to thereby favorably correct the extra-axial aberrations of the fifth lens 45.

Also, a diaphragm 7 is disposed at the entrance surface of the meniscus lens 43, and the relay lens system 4 is adapted to form the image of the light source 1 in the vicinity of the diaphragm 7, thereby favorably correcting the distortion.

Incidentally, since the exit facet of the columnar optical element 3 serves as the illuminating light source (secondary light source surface), aberrations at a comparatively great image height (a position spaced from the optic axis 64), namely, extra-axial aberrations (here, distortion and extra-axial chromatic aberration by way of example) which determine the shape of the facet of the columnar optical element 3 need to be preferentially corrected for the purpose of enhancing the illumination efficiency (that is, lowering an illumination margin).

In consequence of the corrections of the extra-axial aberrations, in this aspect of performance, the illumination margin of the illuminating light source which is substantially similar in shape to the surface to-be-illuminated 5 is decreased to enhance the utilization factor of the light.

Further, owing to the correction of the extra-axial chromatic aberration, colored irradiated regions which are ascribable to the non-superposition of the illuminating light fluxes of monochromatic lights in colors R, G and B and which are inappropriate for the illumination can be diminished, and high-quality illuminations with white light and the R, G and B monochromatic lights are permitted over the whole area of the surface to-be-irradiated 5 (from the center of a projection screen to the corners thereof).

Here, letting symbol f0 denote the focal length of the whole relay lens system 4, and symbol f1 denote the focal length of the first group of lenses 46, the latter f1 in this embodiment is set so as to satisfy the following conditions:

$$0.37 < f1/f0 < 0.62 \qquad (1)$$

When the upper limit of the conditional inequalities (1) is exceeded, the refracting power of the second group of lenses 47 enlarges to increase the distortion. Besides, the interval between the principal points of each of the lenses constituting the groups of lenses of the relay lens system 4 enlarges, and hence, the total length of the relay lens system 4 enlarges unnecessarily. On the other hand, when the lower limit of the conditional inequalities (1) is not reached, the effective diameter of the relay lens system 4 enlarges, and this is demeritorious in points of saving a space and curtailing a cost.

Further, letting symbol f2 denote the focal length of the second group of lenses 47 of the relay lens system 4, and symbol f3 denote the focal length of the third group of lenses 48, the focal lengths f2 and f3 are respectively set under the conditions of inequalities (1) so as to satisfy the following conditions:

$$1.03 < f2/f0 < 1.71 \qquad (2)$$

$$1.70 < f3/f0 < 2.74 \qquad (3)$$

Each of the ratios f2/f0 and f3/f0 demonstrates substantially the same behaviors as those of the ratio f1/f0 in the conditional inequalities (1). The propriety of the range of each of the conditional inequalities (2) and (3) is qualitatively based on the same reasons as in determining the upper and lower limits of the conditional inequalities (1).

Still further, letting symbols υp and υn denote the mean Abbe numbers of the materials of the positive lens 44 and the negative lens 43 constituting the second group of lenses 47, respectively, they are set so as to satisfy the following condition in this aspect of performance:

$$\upsilon p/\upsilon n > 1.99 \qquad (4)$$

When the second group of lenses 47 are formed of the materials satisfying the conditional inequality (4), chromatic aberration ascribable to a magnification can be favorably corrected. Accordingly, the image of the exit facet of the columnar optical element 3 can be efficiently transferred onto the surface to-be-illuminated 5, and coloring at the peripheral part of an illuminated region is suppressed to decrease the illumination margin, thereby enhancing the utilization factor of the light.

Numerical Value Example 1 given in Table 1 below indicates the data of the light source surface, which is the exit facet of the columnar optical element 3, to the surface to-be-illuminated 5 in Embodiment 1. At the first line of the table, symbol f0 denotes the focal length of the whole optical system, symbol FNO the F number thereof, and symbol RED the paraxial magnification thereof.

Besides, at the second line of the table, symbol i denotes the order of a surface as reckoned from the object side (the side of the light source surface), symbol Ri the radius of curvature of the ith lens surface, symbol Di a distance from the ith surface to the (i+1)th lens surface, symbol nd a refractive index for a d ray, and symbol υd for the d ray. Incidentally, R=∞ represents a plane surface.

TABLE 1

(Numerical Value Example 1)
f0 = 76.03  FNO = 3.20  RED = 2.99

| i | Ri | Di | nd | υd |
|---|---|---|---|---|
| Light source surface | ∞ | 12.19959 | | |
| 1 | −32.52016 | 7.50000 | 1.5168 | 64.2 |
| 2 | −15.95350 | 3.00000 | | |
| 3 | 127.92362 | 8.00000 | 1.5168 | 64.2 |
| 4 | −39.89938 | 27.80000 | | |
| 5 | 69.55644 | 2.20000 | 1.7552 | 27.5 |
| 6 | 30.90250 | 3.50000 | | |
| 7 | 41.17075 | 11.30000 | 1.5168 | 64.2 |
| 8 | −41.17050 | 109.00000 | | |
| 9 | 44.63644 | 7.00000 | 1.5168 | 64.2 |
| Surface to-be-illuminated | ∞ | 31.98386 | | |

The values of the terms corresponding to the respective conditional inequalities (1) and (4) in Numerical Value Example 1 are:

$f1/f0=0.38$ $\upsilon p/\upsilon n=2.33$ both of which satisfy the foregoing conditions.

Besides, the values of the terms corresponding to the respective conditional inequalities (2) and (3) are:

$f2/f0=1.04$ $f3/f0=1.72$ both of which similarly satisfy the foregoing conditions.

Further, in Numerical Value Example 1, among the constituent lenses of the relay lens system 4 totaling five, the four lenses except the negative meniscus lens 43 (whose refractive index is nd=1.7552 and which is made of a glass material "E-FD4" produced by HOYA Corporation in Japan, in Numerical Value Example 1) are all made of an identical inexpensive glass material (which is "BSC7" produced by HOYA Corporation and which exhibits a refractive index nd=1.5168, in Numerical Value Example 1). Moreover, the optically functional surfaces of all the four lenses are formed of spherical surfaces. Thus, the manufacturing cost of the relay lens system 4 is suppressed.

Meanwhile, each of Numerical Value Examples 2 and 3 respectively given in Tables 2 and 3 below is the design example of the relay lens system 4 having substantially the same configuration as in Numerical Value Example 1.

In each of Examples 2 and 3, the four lenses except the negative meniscus lens 43 (whose refractive index is nd=1.7174 and which is made of the glass material "E-FD4" produced by HOYA Corporation in Numerical Value Example 2 or whose refractive index is nd=1.6727 and which is made of the glass material "E-FD5" produced by HOYA Corporation in Numerical Value Example 3) are all made of the identical inexpensive glass material (which is "BSC7" produced by HOYA Corporation and which exhibits the refractive index nd=1.5168, in Numerical Value Example 2 or 3). Thus, the effect of cost curtailment similar to the above can be attained.

By the way, it is of course possible to keep an equivalent optical performance by reducing the number of lenses and adopting aspherical lenses. The introduction of this measure into the first group of lenses 46 will be effective in consideration of the effect of the reduction in the number of lenses and the conditions of effective diameters etc.

TABLE 2

(Numerical Value Example 2)
f0 = 43.08   FNO = 3.20   RED = 2.98

| i | Ri | Di | nd | vd |
|---|---|---|---|---|
| Light source surface | ∞ | 9.03307 | | |
| 1 | −33.27773 | 8.00000 | 1.5168 | 64.2 |
| 2 | −15.00000 | 1.00000 | | |
| 3 | 649.26138 | 8.00000 | 1.5168 | 64.2 |
| 4 | −28.39652 | 31.86357 | | |
| 5 | 70.67607 | 2.20000 | 1.7174 | 29.5 |
| 6 | 29.91104 | 2.79141 | | |
| 7 | 38.42558 | 10.00000 | 1.5168 | 64.2 |

TABLE 2-continued (Numerical Value Example 2)
f0 = 43.08   FNO = 3.20   RED = 2.98

| i | Ri | Di | nd | vd |
|---|---|---|---|---|
| 8 | −38.42568 | 109.00000 | | |
| 9 | 38.78784 | 7.00000 | 1.5168 | 64.2 |
| Surface to-be-illuminated | ∞ | 31.05877 | | |

The values of the terms corresponding to the respective conditional inequalities (1) and (4) in Numerical Value Example 2 are:

$f1/f0=0.582$ $\upsilon p/\upsilon n=2.176$ both of which satisfy the foregoing conditions.

Besides, the values of the terms corresponding to the respective conditional inequalities (2) and (3) are:

$f2/f0=1.655$ $f3/f0=2.636$ both of which similarly satisfy the foregoing conditions.

TABLE 3

(Numerical Value Example 3)
f0 = 39.97   FNO = 3.20   RED = 2.98

| i | Ri | Di | nd | vd |
|---|---|---|---|---|
| Light source surface | ∞ | 8.29635 | | |
| 1 | −33.27773 | 8.00000 | 1.5168 | 64.2 |
| 2 | −15.00000 | 1.00000 | | |
| 3 | 649.26138 | 8.00000 | 1.5168 | 64.2 |
| 4 | −28.39652 | 30.08129 | | |
| 5 | 70.67607 | 2.20000 | 1.6727 | 32.2 |
| 6 | 29.91104 | 2.59817 | | |
| 7 | 38.42558 | 10.00000 | 1.5168 | 64.2 |
| 8 | −38.42568 | 109.00000 | | |
| 9 | 38.78784 | 7.00000 | 1.5168 | 64.2 |
| Surface to-be-illuminated | ∞ | 30.69077 | | |

The values of the terms corresponding to the respective conditional inequalities (1) and (4) in Numerical Value Example 3 are:

$f1/f0=0.617$ $\upsilon p/\upsilon n=1.994$ both of which satisfy the foregoing conditions.

Besides, the values of the terms corresponding to the respective conditional inequalities (2) and (3) are:

$f2/f0=1.705$ $f3/f0=2.736$ both of which similarly satisfy the foregoing conditions.

As exemplified by the practicable Numerical Value Examples, according to the illuminating optical system in this embodiment as satisfies the requirements of the conditional inequalities (1) through (3) mentioned before, it is possible to realize the illuminating optical system in which the secondary light source surface formed at the exit facet of the columnar optical element 3 has a good quality, that is, the intensity distribution of light on the surface to-be-irradiated 5 is held uniform. Of course, the brightness of a projected image is uniformalized in a projection type display apparatus employing such an illuminating optical system.

Here, the system constituents of the light source 1 to the columnar optical element 3 will be explained in detail.

The light source 1 shown in FIG. 1 is made of a light emitting member which emits white light, monochromatic light, or the like. Preferable as the light source 1 is one in which the size of an effective light emitting body (light emitting portion) is small and whose luminous efficacy is high, for example, a metal halide lamp or a superhigh-pressure mercury lamp.

The reason therefor is that, in a case where light diverging from the light source 1 is focused by the reflector 11, the smaller size of the light source 1 facilitates collimation by the reflector 11 more, so the light is more condensed on the entrance facet of the columnar optical element 3 by the succeeding condenser lens system 2, and a light condensing efficiency can be made higher.

In this embodiment, the inner surface of the reflector 11 is shaped into a paraboloid of revolution being one of quadratic curved surfaces of revolution, and the light source 1 is arranged so as to lie in the vicinity of the focal point of the paraboloid.

Light rays substantially collimated by the reflector 11 are converged by the condenser lens system 2, so as to form the image of the light source 1. The size and angular distribution (a luminous intensity distribution around the optic axis 64) of the image of the light source 1 can be approximated to predetermined values by the setting of the condenser lens system 2.

In this embodiment, a discharge lamp having an electrode gap length of about 1.3 (mm) is employed as the light source 1, the paraboloid of the reflector 11 has a focal length of 7.5 (mm), and the image of the light source 1 is formed into an effective diameter of about 4 (mm) by the condenser lens system 2.

Of course, it is also preferable to configure a condensing optical system in which the reflector 11 is an ellipsoid-of-revolution mirror and which does not employ the condenser lens system 2 (in this case, the reflector 11 serves as focusing means). Anyway, it is important to configure the condenser lens system 2 by taking into consideration the uniformity, irradiation margin, etc. of light in that image of the light source 1 which is brought onto the surface to-be-irradiated 5 by the succeeding columnar optical element 3 and relay lens system 4.

The geometries of the exit facet of the columnar optical element 3 can be determined from the image formation magnification of the relay lens system 4 and the size of the surface to-be-illuminated 5. In this case, in order to make the best use of the image forming performance of the relay lens system 4, the shape of the exit facet of the columnar optical element 3 should desirably be made similar to that of the surface to-be-illuminated 5.

Figure 2:
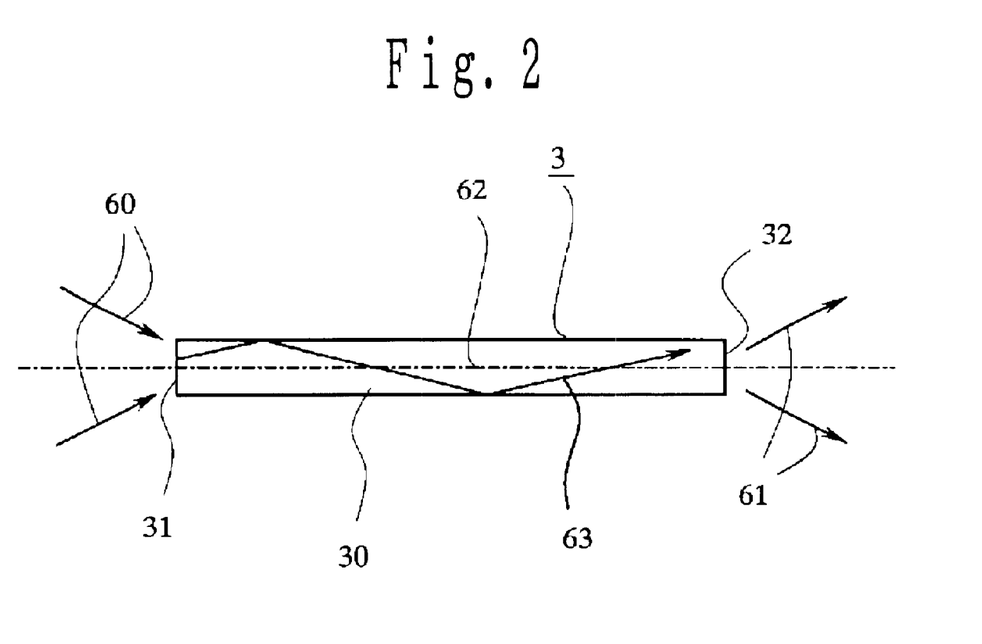
FIG. 2 is a schematic diagram for explaining a columnar optical element in Embodiment 1.

FIG. 2 is a sectional view showing an example in which the columnar optical element 3 is formed of a glass rod 30. Referring to the figure, numeral 31 designates an entrance facet, numeral 32 an exit facet having the same shape as that of the entrance facet 31, numeral 60 entering light rays, numeral 61 exiting light rays, and numeral 62 the optic axis of the columnar optical element 3 (this optic axis agrees with the illuminating optic axis 64 shown in FIG. 1, when the element 3 is assembled in the illuminating optical system).

When the entrance facet 31 is arranged at a position where the image of the light source 1 is formed, a light transferring efficiency becomes the highest. Since, however, the energy density of entering light is high, it is important to heighten the heat-proof property of the element 3.

Light rays 63 having entered into the columnar optical element 3 are efficiently transferred by a total reflection action which arises at the interface between the sidewall surfaces of the glass rod 30 and the air, and that non-uniformity in the intensity distribution of the entering light which has arisen at the entrance facet 31 is eliminated by the repetition of the total reflections. Accordingly, when the element 3 is set at a suitable length, a light source surface of very high uniformity can be formed at the exit facet 32 (the light source surface thus formed serves as the secondary light source surface).

Regarding the degrees of flatness of all surfaces constituting the columnar optical element 3 (especially, the sidewall surfaces giving rise to the total reflections), the degrees of parallelism between the entrance facet 31 and the exit facet 32 and between the side surfaces, and so forth, even the tolerances of ordinary plane glass members have no problem for the formation of the image of the light source 1 (the secondary light source surface) in many cases. Incidentally, modified examples in which the geometries of the entrance facet 31 and the exit facet 32 are changed are of course possible.

Figure 3:
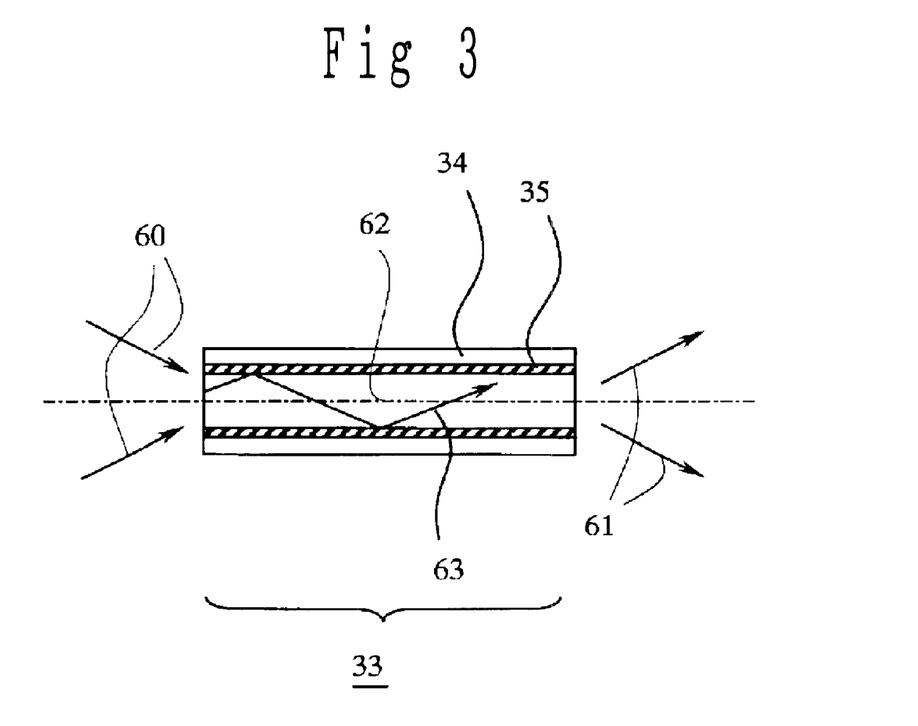
FIG. 3 is a schematic diagram for explaining a modification to the columnar optical element in Embodiment 1.

A modified example of the columnar optical element 3 is shown as a sectional view in FIG. 3. Referring to the figure, numeral 33 designates a hollow rod, numeral 34 a base member, and numeral 35 a reflective member. Thus, a hollow columnar element is formed of four plane surfaces. Of course, the hollow columnar element is not necessarily be formed of the four plane surfaces, but it may well be circular on its entrance side and have a tetragonal opening on its exit side. For the sake of brevity, however, the hollow columnar element shall be explained here as being formed of the four plane surfaces.

The reflective member 35 is arranged on the inner surface of the base member 34, light having entered into the hollow rod 33 from the entrance facet thereof proceeds while repeating reflections from the reflective member 35, and a light source surface having a uniform intensity distribution as in the case of the foregoing glass rod 30 is formed in the vicinity of the exit opening of the hollow rod 33.

In general, as compared with an optical element of rod type utilizing total reflections, an optical element employing a reflective member has an inferior efficiency because a loss is involved in the reflective member. However, when aluminum of high purity is vacuum-evaporated on a base member obtained by the alumite treatment of the surface of an aluminum material and is further overlaid with an $SiO_2$ film, a $TiO_2$ film or the like evaporated as a protective layer, the optical element employing the reflective member can be endowed with a reflection property, a heat-proof property and a weather-proof property which are favorable. Suitable as such a material is, for example, "MIRO" produced by Alanod Aluminium-Veredlung GmbH & Co.KG in Germany.

According to the hollow rod 33 explained above, a light condensing point (of high energy density) by the condenser lens system 2 can be formed at an opening position (namely, space) on the entrance side of this hollow rod 33, so that the loss of light at the position does not arise. Besides, the whole hollow rod 33 can be fabricated using the metals of high heat radiating effects, so that the hollow rod 33 can be cooled with ease.

Moreover, even when the outer wall surfaces of the hollow rod 33 are used for support, the reflecting performance of the inner surfaces is hardly affected, so that the hollow rod 33 can be supported by a simple method and is meritorious in point of cost. Further, the hollow rod 33 can be molded merely by the bending work of a member (for example, a plate-like member), so that the fabrication is easy.

While the illuminating optical system in this embodiment has been described above, it can of course be compacted as an illumination apparatus in such a way that a reflecting mirror (bending mirror) being optical-path deflection means is additionally arranged at a suitable position, for example, between the second group of lenses 47 (the fourth lens 44) and the third group of lenses 48 (the fifth lens 45) in the relay lens system 4, thereby bending the optical path of the whole system.

Figure 4:
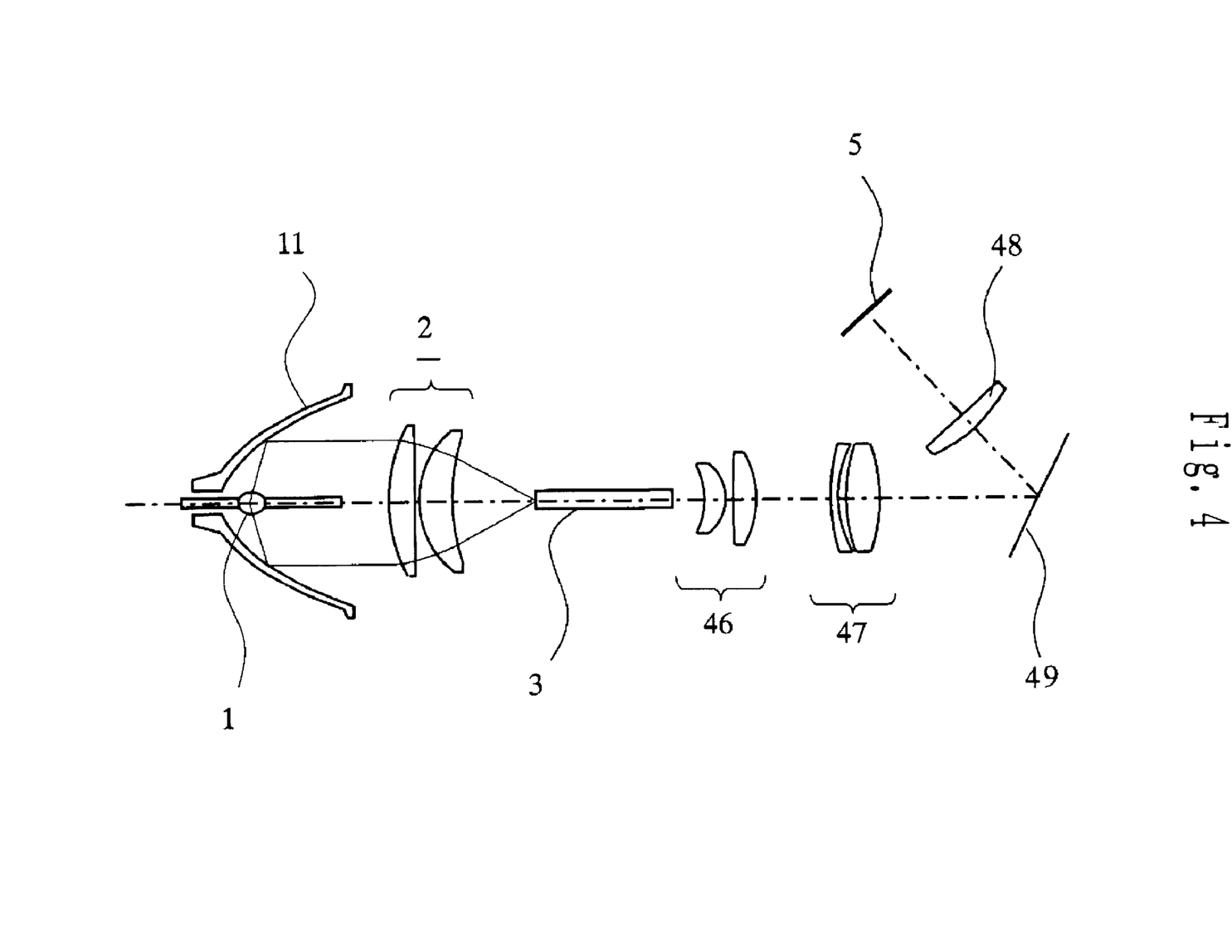
FIG. 4 is a schematic arrangement diagram showing the construction of a modification to the illumination apparatus according to Embodiment 1.

FIG. 4 shows an example of architecture in which the whole system is compacted by adding a reflecting mirror 49 as optical-path deflection means and bending the optical path of the whole system. In this manner, modified embodiments within a scope which does not depart from the object of this embodiment and within which the effects thereof are enjoyable can be made without any problem and without narrowly restricting the rights of the present invention.

EMBODIMENT 2

Optical System of Projection Apparatus

Figure 5:
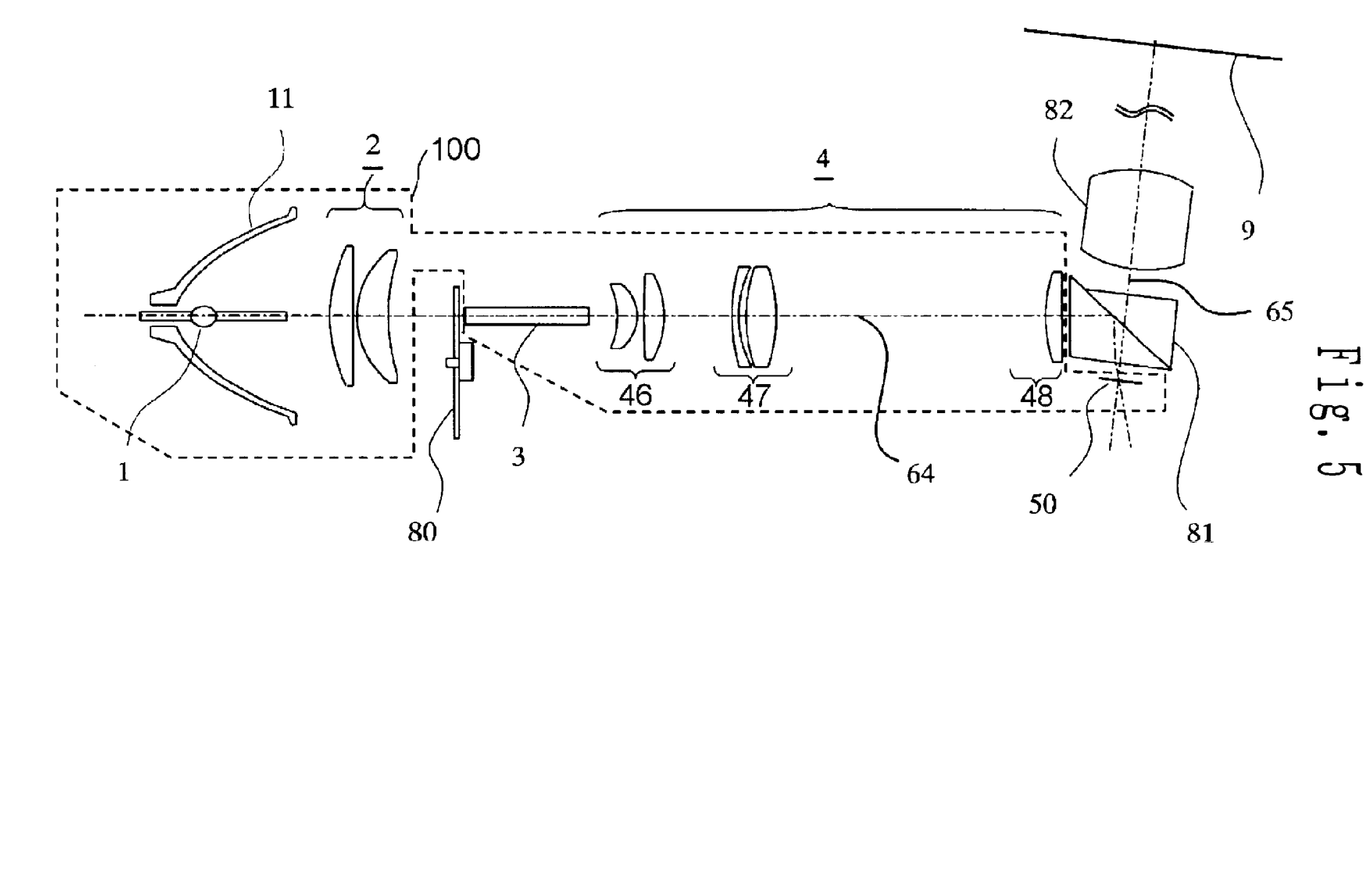
FIG. 5 is a schematic arrangement diagram showing the construction of a projection type display apparatus according to Embodiment 2.

FIG. 5 is a diagram showing the optical system of a single-plate type projection apparatus according to Embodiment 2 of the present invention.

Referring to the figure, numeral 50 designates a reflection type light valve typified by an optical element which is so constructed that minute movable mirrors corresponding to pixels on a screen 9 are arrayed in the shape of a matrix, and which is, for example, "DMD" (Digital Micromirror Device) produced by Texas Instruments Incorporated.

Numeral 80 designates a rotating color filter (sometimes called "color wheel") in which optical filter regions of colors R, G and B are sequentially changed-over by rotation, numeral 81 a prism, and numeral 82 a projection lens which is projection means, and numeral 9 a screen. The other numerals are the same as indicated in FIG. 1, and shall be omitted from description.

The illuminating optical system described in Embodiment 1 is represented by numeral 100 in the figure, and this system 100 is a constituent which is added anew in constructing the projection apparatus out of the other constituents. The operations of the light source 1 to the reflection type light valve 50 are the same as described in Embodiment 1.

In the optical path of the illuminating optical system 100, the prism 81 is arranged immediately before the reflection type light valve 50. The prism 81 has a light entrance surface which is perpendicular to the illuminating optic axis 64, and a light exit surface which is parallel to the optical surface of the reflection type light valve 50 (for example, the principal surface of the reflection type light valve 50 in a state where no displacement is given to a mirror surface constituting this light valve 50). Also, the prism 80 deflects illuminating light (that is, bends it toward the reflection type light valve 50) by utilizing a total reflection action in the interior thereof.

By the way, as regards the details of the prism 81, reference shall be referred to, for example, U.S. Pat. No. 5,604,624, and Japanese Patent Applications No. 278490/1999 and No. 297879/1999 filed by the same assignee as in the present application.

The prism 81 unites the illuminating performance of the illuminating optical system and the projecting performance of the projection lens 82 compatibly, and it separates the illuminating optic axis 64 and a projecting optic axis 65, thereby avoiding the physical interference of the optical systems before and behind the reflection type light valve 50 (this function shall be termed "optical-path separating action").

Besides, the rotating color filter 80 is an optical device which realizes field-sequential coloring when rotated in synchronism with the synchronizing signal of a video signal by way of example, and which often constitutes a projection type display apparatus in combination with the DMD mentioned above. Incidentally, light exiting from the projection lens 82 is enlarged and projected on the screen 9 and can offer a large-sized image (that is, modulated light generated by the reflection type light valve 50 functioning as light modulation means to be stated below is projected).

As the reflection type light valve 50 being the light modulation means, the DMD functions to select the direction of reflecting entering light, by changing the inclination of the micromirror, and to endow an entering light flux with two-dimensional modulation based on picture information. Thus, the illuminated light becomes modulated light corresponding to the pixel to-be-projected. The light selecting action highly matches with the optical-path separating action of the prism 81, so that the projection apparatus can be constructed with a very small space.

By the way, the reflection type light valve 50 is disposed at the position of the surface to-be-irradiated 5 in Embodiment 1 (here in Embodiment 2, the reflection type light valve 50 is illuminated through the prism 81).

As described in Embodiment 1, the illuminating optical system 100 can illuminate the surface to-be-illuminated 5 very efficiently and uniformly. Therefore, when the system 100 is applied to the projection apparatus in Embodiment 2, it is permitted to construct the optical system of very high light utilization factor, compact structure and low cost, and to finally obtain a bright projected image. These merits can be attained irrespective of whether a projection scheme is front projection or rear projection.

Of course, the architecture of the illuminating optical system 100 in this case is not restricted to the example shown in FIG. 1, but the reflecting mirror or the like may well be additionally arranged in the illuminating optical system 100 so as to bend this system 100 into a compact structure, as described with reference to FIG. 4 in Embodiment 1, whereby a projection apparatus of smaller size and lighter weight can also be realized.

Incidentally, as the diameter of a light beam to be transmitted through the rotating color filter 80 is smaller, the enlargement of the apparatus can be suppressed more. Therefore, the rotating color filter 80 should desirably be arranged at that position of the illuminating optical system 100 at which the light beam diameter is smaller. Concretely, it should desirably be arranged immediately before the columnar optical element 3 as shown in FIG. 5 or immediately behind the same (it is disposed in the vicinity of either of the light entrance portion or light exit portion of the columnar optical element 3).

Regarding coloring, the rotating color filter 80 need not always be employed, but any coloring means can be arranged at a part of the optical system without any problem as long as it highly matches with the illuminating optical system 100 and can provide a projection apparatus of high efficiency.

In the above, the present invention has been described on the two embodiments. Of course, however, the present invention is not restricted to the two embodiments, but various modifications are possible within a scope not departing from the object of the present invention and not altering the subject matter thereof.

Since these embodiments are constructed as described above, effects to be stated below are brought forth.

An illumination apparatus according to these embodiments are characterized by comprising focusing means for focusing light emitted from a light source; columnar optical means having its light entrance portion located in the vicinity of a position where the emitted light is focused by the focusing means, and for propagating the entering light having entered from the light entrance portion and causing the propagated light to exit from its light exit portion; and transferring optical means including a first group of lenses which receive the exiting light from the columnar optical means and which have a positive refracting power, a second group of lenses which receive exiting light from the first group of lenses and which have a positive refracting power, and a third group of lenses which receive exiting light from the second group of lenses and which have a positive refracting power, wherein the respective groups of lenses are successively arrayed from a side of the columnar optical means toward a side of a surface to-be-illuminated and satisfy relationships of inequalities (1) and (2) given below, and wherein the light exit portion of the columnar optical means and the surface to-be-illuminated are held in a conjugate relationship;

$$0.37 < f1/f0 < 0.62 \qquad (1)$$

$$\upsilon p/\upsilon n > 1.99 \qquad (2)$$

where
f0: focal length of the transferring optical means,
f1: focal length of the first group of lenses,
υp: means Abbe number of a positive lens included in the second group of lenses, and
υn: means Abbe number of a negative lens included in the second group of lenses. Therefore, the illumination apparatus whose utilization factor of light is high can be provided.

Besides, the illumination apparatus is characterized in that the second group of lenses include a meniscus lens which is convex to the side of the columnar optical means and which has a negative refracting power, and a biconvex lens, and that the respective lenses are successively arrayed from said side of the columnar optical means toward the side of the surface to-be-illuminated. Therefore, extra-axial aberrations can be favorably corrected, and the illumination apparatus whose utilization factor of light is high can be provided.

In addition, the illumination apparatus is characterized in that, among the lenses constituting the first to third groups of lenses, the meniscus lens having the negative refracting power and included in the second group of lenses is made of a glass material which is different from a glass material of any other lens, and that the glass materials of all the other lenses are of the same kind. Therefore, the illumination apparatus of lower cost can be provided without degrading an optical performance.

Also, the illumination apparatus is characterized by further comprising optical-path deflection means between the second group of lenses and the third group of lenses. Therefore, the illumination apparatus of compact construction can be provided.

Also, the illumination apparatus is characterized in that the columnar optical means has a hollow structure, an inner surface of which is a reflective surface. Therefore, the heat radiation and support of the columnar optical means can be done with ease, and the illumination apparatus of lower cost can be provided.

A projection type display apparatus according to these present embodiments are characterized by comprising a light source; focusing means for focusing light emitted from the light source; columnar optical means having its light entrance portion located in the vicinity of a position where the emitted light is focused by said focusing means, and for propagating the entering light having entered from the light entrance portion and causing the propagated light to exit from its light exit portion; transferring optical means including a first group of lenses which receive the exiting light from the columnar optical means and which have a positive refracting power, a second group of lenses which receive exiting light from the first group of lenses and which have a positive refracting power, and a third group of lenses which receive exiting light from the second group of lenses and which have a positive refracting power, wherein the respective groups of lenses are successively arrayed from a side of said columnar optical means toward a side of a surface to-be-illuminated and satisfy relationships of inequalities (1) and (2) given below, and wherein the light exit portion of said columnar optical means and the surface to-be-illuminated are held in a conjugate relationship; optical-path deflection means receiving light exiting from the transferring optical means, and for deflecting the exiting light in a direction different from an entering direction thereof; light modulation means disposed at a position of the surface to-be-irradiated so as to receive the exiting light from the transferring optical means after the deflection by the optical-path deflection means, and for modulating the exiting light in two dimensions so as to generate modulated light; and projection means for projecting the modulated light generated by the light modulation means;

$$0.37 < f1/f0 < 0.62 \qquad (1)$$

$$\upsilon p/\upsilon n > 1.99 \qquad (2)$$

where
f0: focal length of the transferring optical means,
f1: focal length of the first group of lenses,
υp: means Abbe number of appositive lens included in the second group of lenses, and
υn: means Abbe number of a negative lens included in the second group of lenses. Therefore, the projection type display apparatus of high light utilization factor and bright projection image can be realized.

Besides, the projection type display apparatus is characterized by further comprising optical-path deflection means between the second group of lenses and the third group of lenses. Therefore, the projection type display apparatus of compact structure can be realized.

Also, the projection type display apparatus is characterized in that a color filter is disposed in the vicinity of either of the light entrance portion and the light exit portion of the columnar optical means. Therefore, the small-sized color filter can be employed to realize the projection type display apparatus of compact structure.

What is claimed is:
1. An illumination apparatus comprising:
focusing means for focusing light emitted from a light source;
columnar optical means having its light entrance portion located in the vicinity of a position where the emitted light is focused by said focusing means, and for propagating the entering light having entered from the light entrance portion and causing the propagated light to exit from its light exit portion; and transferring optical means including a first group of lenses which receive the exiting light from said columnar optical means and which have a positive refracting power, a second group of lenses which receive exiting light from the first group of lenses and which have a positive refracting power, and a third group of lenses which receive exiting light from the second group of lenses and which have a positive refracting power, wherein the respective groups of lenses are successively arrayed from a side of said columnar optical means toward a side of a surface to-be-illuminated and satisfy relationships of inequalities (1) and (2) given below, and wherein the light exit portion of said columnar optical means and the surface to-be-illuminated are held in a conjugate relationship;

$$0.37 < f1/f0 < 0.62 \tag{1}$$

$$\upsilon p/\upsilon n > 1.99 \tag{2}$$

where f0: focal length of said transferring optical means, f1: focal length of said first group of lenses, υp: means Abbe number of a positive lens included in said second group of lenses, and υn: means Abbe number of a negative lens included in said second group of lenses.

2. An illumination apparatus as defined in claim 1, wherein said second group of lenses include a meniscus lens which is convex to the side of said columnar optical means and which has a negative refracting power, and a biconvex lens, and the respective lenses are successively arrayed from said side of said columnar optical means toward the side of the surface to-be-illuminated.

3. An illumination apparatus as defined in claim 2, wherein among the lenses constituting the first to third groups of lenses, the meniscus lens having the negative refracting power and included in said second group of lenses is made of a glass material which is different from a glass material of any other lens, and the glass materials of all the other lenses are of the same kind.

4. An illumination apparatus as defined in claim 1, further comprising optical-path deflection means between said second group of lenses and said third group of lenses.

5. An illumination apparatus as defined in claim 2, further comprising optical-path deflection means between said second group of lenses and said third group of lenses.

6. An illumination apparatus as defined in claim 3, further comprising optical-path deflection means between said second group of lenses and said third group of lenses.

7. An illumination apparatus as defined in claim 1, wherein said columnar optical means has a hollow structure, an inner surface of which is a reflective surface.

8. A projection type display apparatus comprising:

a light source;

focusing means for focusing light emitted from said light source;

columnar optical means having its light entrance portion located in the vicinity of a position where the emitted light is focused by said focusing means, and for propagating the entering light having entered from the light entrance portion and causing the propagated light to exit from its light exit portion;

transferring optical means including a first group of lenses which receive the exiting light from said columnar optical means and which have a positive refracting power, a second group of lenses which receive exiting light from the first group of lenses and which have a positive refracting power, and a third group of lenses which receive exiting light from the second group of lenses and which have a positive refracting power, wherein the respective groups of lenses are successively arrayed from a side of said columnar optical means toward a side of a surface to-be-illuminated and satisfy relationships of inequalities (1) and (2) given below, and wherein the light exit portion of said columnar optical means and the surface to-be-illuminated are held in a conjugate relationship;

optical-path deflection means receiving light exiting from said transferring optical means, and for deflecting the exiting light in a direction different from an entering direction thereof;

light modulation means disposed at a position of the surface to-be-irradiated so as to receive the exiting light from said transferring optical means after the deflection by said optical-path deflection means, and for modulating said exiting light in two dimensions so as to generate modulated light; and projection means for projecting the modulated light generated by said light modulation means;

$$0.37 < f1/f0 < 0.62 \tag{1}$$

$$\upsilon p/\upsilon n > 1.99 \tag{2}$$

where f0: focal length of said transferring optical means, f1: focal length of said first group of lenses, υp: means Abbe number of a positive lens included in said second group of lenses, and υn: means Abbe number of a negative lens included in said second group of lenses.

9. A projection type display apparatus as defined in claim 8, further comprising optical-path deflection means between said second group of lenses and the third group of lenses.

10. A projection type display apparatus as defined in claim 8, wherein a color filter is disposed in the vicinity of either of the light entrance portion and the light exit portion of said columnar optical means.

* * * * *